United States Patent [19]

Isip, Jr. et al.

[11] Patent Number: 6,115,722

[45] Date of Patent: Sep. 5, 2000

[54] METHOD FOR CHECKING TABLESPACES INVOLVED IN REFERENTIAL INTEGRITY

[75] Inventors: Amando B. Isip, Jr., Richardson, Tex.; Christopher F. Parker, Oswego; Stephen J. Weaver, Lisle, both of Ill.

[73] Assignee: Computer Associates Think, Inc., Islandia, N.Y.

[21] Appl. No.: 09/208,118

[22] Filed: Dec. 9, 1998

Related U.S. Application Data

[60] Provisional application No. 60/105,883, Oct. 27, 1998.

[51] Int. Cl.[7] .................................................. G06F 17/30
[52] U.S. Cl. ............................ 707/202; 707/7; 707/101; 707/102; 707/201; 707/202; 395/701
[58] Field of Search ..................................... 707/101, 102, 707/201, 202, 7; 395/701

[56] References Cited

U.S. PATENT DOCUMENTS

| | | | |
|---|---|---|---|
| 5,222,235 | 6/1993 | Hintz et al. | 707/101 |
| 5,396,623 | 3/1995 | McCall et al. | 707/101 |
| 5,408,654 | 4/1995 | Barry | 707/101 |
| 5,710,916 | 1/1998 | Barbara et al. | 707/9 |
| 5,758,357 | 5/1998 | Barry et al. | 707/202 |
| 5,812,849 | 9/1998 | Nykiel et al. | 395/701 |
| 5,887,274 | 3/1999 | Barry et al. | 707/202 |
| 5,937,415 | 8/1999 | Sheffield et al. | 707/204 |

OTHER PUBLICATIONS

Chomicki, Jan et al., "Implementing temporal integrity constraints using an active DBMS", IEEE Transaction on Knowledge and Data Engineering, Aug. 1995 vol. 7, Issue: 4, pp 566–582, Aug. 1995.

Kim, D et al., "A temporal database management main memory prototype", Proceeding of 1994 TENCON '94, IEEE Region 10's Ninth Annual International Conference. Theme: Frontiers of Computer Technology. Aug. 22–28, 1994. vol. 1, pp 391–396, Aug. 1994.

*Primary Examiner*—Jack M. Choules
*Assistant Examiner*—Shahid Alam
*Attorney, Agent, or Firm*—Baker & McKenzie

[57] ABSTRACT

A recover or reload utility determines if a check utility is to be executed. If a check utility is to be executed, the recover or reload utility records the dependent tablespace names to virtual storage allocated to a job step instead of to virtual storage allocated to a subtask. After the recover or reload utility performs its function, if a check utility is next, the database operating system will not freemain the virtual storage (e.g, data area) into which the recover or reload utility has recorded the names of the dependent tablespaces when the subtask ends. Upon termination of the recover or reload utility, the persistent data area is available for the check utility to use.

2 Claims, 2 Drawing Sheets

METHOD FOR CHECKING TABLESPACES INVOLVED IN REFERENTIAL INTEGRITY

This application claims the benefit of the provision application filed Oct. 27, 1998 and having Ser. No. 60/105,883.

FIELD OF THE INVENTION

The present invention relates to database management systems, and particularly to a method for checking tablespaces involved in referential integrity for a database management system.

BACKGROUND INFORMATION

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables which are in tablespaces. A tablespace is, for example, a portion of storage space in a direct access storage device (DASD) such as a disk drive. For exemplary purposes, illustrated below is an order_entry table that would be stored in a tablespace. The order_entry table contains columns: customer_number; product_code; order_number; buyer_name; and ship_to_zip.

Order_Entry Table

| customer_number | product_code | order_number | buyer_name | ship_to_zip |
|---|---|---|---|---|
| 1111111111 | 0010 | 1234500001 | John Doe | 60606 |
| 1111111111 | 0040 | 1234500002 | Jane Doe | 70707 |
| 3333333333 | 0020 | 1234500003 | Bill Smith | 90909 |
| 2222222222 | 0030 | 1234500004 | Fred Smith | 80808 |

While the above Order_Entry table shows four rows, the table could have millions of rows for all the orders of a company, for example 4 million rows. The order_entry table also has, for example, three index keys and two foreign keys. An index key is an identifier for a particular row of a table while a foreign key also identifies a row but is also used for referential integrity as described below. For example, in the order_entry table, one index key could be based on Order_Number, another index key based on buyer_name and a third index key based on ship_to_zip. As is known in the art, an index key for a particular table indicates a row identification (RID) and a selected value for the row (e.g., the index key value).

The index key can be used to generate an index for the table which facilitates subsequent searches for particular data in the table. For example, the Order_Entry table would have three indexes (e.g., one for each index key), each index being stored in an indexspace. Similar to a tablespace, an indexspace is, for example, a designated portion of a DASD. Thus, if a user was looking for rows that contain a particular buyer name in the Order_Entry table, the database management system could query the buyer index for the table to identify all occurrences of the buyer name without reading the entire table to locate the rows.

DB2 administrators analyze performance characteristics for application programs that access a database table in an attempt to find the optimum index structure for fast access to the database table. The values to be used as an index must be carefully selected because each index results in overhead for the database system. For example, each transaction in a database table, such as an add or delete, requires that each index for the table also be updated. Thus, it is desirable that the number of indexes for a table be minimized to enhance the performance of application programs. The values to be used as an index for a database table are selected based on, for example, data accessed most frequently by users of the table, generally on-line transaction users. Index keys generally are not based on foreign keys, as foreign keys are used primarily for validation purposes (e.g., constraint enforcement).

As is known in the art, each table in a database may be either a parent table, a child table or both. A child table is related to a parent table via the foreign key value or values contained in columns of the child table. For example, a foreign key value can appear multiple times in a child table (e.g., multiple rows in a child table can have the same foreign key, such as the customer_number and product_code entries in the order_entry table) but each foreign key must be associated with a unique key in a parent table of the child table.

Referential integrity ensures that every foreign key value is valid (e.g., has a corresponding primary key in a parent table). Thus, referential integrity (RI) means that a value in the column of a row in the table is valid when this value also exists in an index of another table. A row should not be in a table if it violates a constraint. As the order_entry table illustrated above has two foreign keys, it has a RI constraint on customer_number and product_code. As is known in the art, when a user of a DB2 database management system creates a table, the user also defines the constraints for the table (e.g., the user can define the relational integrity criteria). Illustrated below are an exemplary product table and an exemplary customer table (e.g., the parent tables for the foreign keys in the order_entry table).

Product Table

| product_code | product_description | retail_price |
|---|---|---|
| 00010 | laptop pc | 1000.00 |
|  | desktop pc | 1100.00 |
| 00020 |  |  |
| 00030 | office pc | 1200.00 |
| 00040 | lan pc | 3500.00 |
| 00050 | home pc | 999.99 |

The product table show five rows, although the table could have thousands of rows for all of the different products of a company. The product table has, for example, an index based on the column product_code, which values are illustrated in ascending order. The values in the column product_code are each unique since there is only one product code assigned to each product and thus in this table, a product code would not be included more than once.

Accordingly, an index for the product table would include the key value (e.g., the stored value in the product_code column) and a RID. The product table index would reside in a DB2 indexspace.

The customer table illustrated below shows four rows, although this table could also have thousands of rows for all of the customers of a company. The customer table has, for example, an index based on the column customer_number, which values are illustrated in ascending order. The values in the column customer_number are each unique since there is only one customer number assigned to each customer name and thus a customer number would not be included in this table more than once. Accordingly, an index for the customer table would include the key value (e.g., the value of the column customer_number) and a RID. The customer index would also reside in a DB2 indexspace.

| Customer Table | | |
|---|---|---|
| customer_number | buyer_name | customer_address |
| 1111111111 | John Doe | State A |
| 2222222222 | Fred Smith | State B |
| 3333333333 | Bill Smith | State C |
| 4444444444 | Steve Jones | State D |

As shown by the above tables, all of the rows in the Order_Entry table are valid (e.g., there are no referential integrity constraint violations) because the foreign key values in the column product_code of the Order_Entry table also exist in the product table and the values in the column customer_number of the Order_Entry table also exist in the customer table.

Conventional database management systems, such as DB2, provide the user with the ability to identify specific conditions that a row must meet before it can be added to a table. These conditions are referred to as "constraints" because they constrain the values that a row may include. Constraints include, for example, check constraints and referential integrity constraints. Check constraints include, for example, qualifying criteria for a particular value, such as a zip code value (e.g., the ship_to_zip value in the Order_Entry table) being in the range of 00000 to 99999. As discussed above, referential integrity constraints ensure that a value in a row of a table is valid when the value also exists in an index of another table.

Constraint enforcement can be performed prior to loading of data into a database table or after data has already been loaded into a database table. When constraint enforcement is performed after loading data into a database table, for example as part of a recovery operation following a hardware of software failure, the constraint enforcement is generally performed by a CHECK utility, such as CHECK DATA by IBM Corp., CHECK PLUS by BMC Software and FASTCHECK by Platinum technology, inc.

Conventional CHECK utilities ensure that data in the table do not violate any constraints that have been established for the table. Constraints can be established at the time the table is generated. For example, constraints can be defined when the table is originally created in the database system and are stored in the DB2 catalog, which can be subsequently queried by a CHECK utility to identify the constraint information. A description of how to read the DB2 catalog is contained in co-pending application Ser. No. 09/151,750 entitled DYNAMIC DETERMINATION OF OPTIMAL PROCESS FOR ENFORCING CONSTRAINTS, assigned to the assignee of the present application and which is hereby expressly incorporated by reference.

To perform constraint enforcement, a conventional CHECK utility would, for example, be initialized and identify any applicable constraints for the table to be checked by reading the DB2 catalog, as is known in the art. The CHECK utility would, for example, then read each row of the database table and check for check constraint violations and/or referential integrity constraint violations.

Some DB2 tables have referential integrity constraints. A typical user application system has, for example, three parent tables and thirty one dependent tables. Some customers have as many as twenty one parent tables for one application system. There are various circumstances in which a database table is altered. For example, the table may be recovered from a backup file or reloaded with a new set of data. When a parent table is reloaded or recovered, the dependent tables may be out of synchronization with their respective parent table. For example, a recovered table may have used a backing file that was several days old and thus the recovered table may be out of synch with a dependent table which was in synch with the pre-recovered parent table.

Accordingly, the recover utility or the reload utility must identify all of the dependent tables for each parent tables that has been recovered or reloaded and set these dependent tables to a "check pending" status. Identification of the dependent table can be accomplished, for example, by reading the DB2 catalog as described above. As is known in the art, dependent tables in check pending this status are not accessible to the user programs until a CHECK utility is executed and any referential integrity violations corrected.

When recovering or reloading a tablespace with defined referential integrity constraints, the customer must run the Report Tablespace-Set utility which will generate a listing of all dependent tablespaces that needs to be checked.

For a reload operation in conventional database systems, the user needs to code and run a conventional Load utility naming the tables that should be reloaded. The following example is such a control statement to be provided to a conventional Load utility.

---

LOAD RESUME NO REPLACE INTO TABLE CTINLAND.TBHAMEP1
LOAD RESUME NO REPLACE INTO TABLE CTINLAND.TBHAMEP2
LOAD RESUME NO REPLACE INTO TABLE CTINLAND.TBHAMEP3

---

As the reload operation puts the dependent tables of the reloaded table into a check pending status, the user of the Load utility also needs to code and run a control statement for a conventional CHECK utility naming all the dependent tablespaces. An example of such a control statement to be provided to a conventional CHECK utility is as follows.

---

CHECK DATA
    , TABLESPACE JTINLAND.SCHORDCT
    , TABLESPACE JTINLAND.SCHITMDI
    , TABLESPACE JTINLAND.SCHHDINF
    , TABLESPACE JTINLAND.SCHREFL2
    , TABLESPACE JTINLAND.SCHCMAIL
    , TABLESPACE JTINLAND.SCHBILDG

-continued

, TABLESPACE JTINLAND.SCHFACFW
, TABLESPACE JTINLAND.SCHEHRAC
, TABLESPACE JTINLAND.SCHCOATI
, TABLESPACE JTINLAND.SCHCTGCM
, TABLESPACE JTINLAND.SCHSSTCK
, TABLESPACE JTINLAND.SCHSRORD
, TABLESPACE JTINLAND.SCPEPRCE
, TABLESPACE JTINLAND.SQOMFGHD
, TABLESPACE JTINLAND.SQOMFCHI
, TABLESPACE JTINLAND.SQOMFCMT
, TABLESPACE JTINLAND.SQOMFOVR
, TABLESPACE JTINLAND.SQOMFOVU
, TABLESPACE JTINLAND.SQOMFMPL
, TABLESPACE JTINLAND.SQOMFOVP
, TABLESPACE JTINLAND.SQOMFCHE
, TABLESPACE JTINLAND.SQOMFUNT
, TABLESPACE JTINLAND.SQOMFTRQ
, TABLESPACE JTINLAND.SCHEITMR
, TABLESPACE JTINLAND.SCHORDFW
, TABLESPACE JTINLAND.SCHORHLD
, TABLESPACE JTINLAND.SCHREFRL
, TABLESPACE JTINLAND.SCHRETYP
, TABLESPACE JTINLAND.SCPEPICS
, TABLESPACE JTINLAND.SCHERCYL
, TABLESPACE JTINLAND.SCHCACKW

For a recovery operation in conventional database systems, the user needs to code and run a conventional recover utility naming the tablespace that should be recovered.

The following example is a control statement for a conventional recover utility.

RECOVER TABLESPACE JTINLAND.SCHAMEP1
TABLESPACE JTINLAND.SCHAMEP2
TABLESPACE JTINLAND.SCHAMEP3

Further, the user needs to code and run a control statement for a conventional Check utility naming all the dependent tablespaces from, for example, the Report Tablespace-Set utility. An example of a control statement to be provided to a conventional Check utility is as follows.

CHECK DATA
, TABLESPACE JTINLAND.SCHORDCT
, TABLESPACE JTINLAND.SCHITMDI
, TABLESPACE JTINLAND.SCHHDINF
, TABLESPACE JTINLAND.SCHREFL2
, TABLESPACE JTINLAND.SCHCMAIL
, TABLESPACE JTINLAND.SCHBILDG
, TABLESPACE JTINLAND.SCHFACFW
, TABLESPACE JTINLAND.SCHEHRAC
, TABLESPACE JTINLAND.SCHCOATI
, TABLESPACE JTINLAND.SCHCTGCM
, TABLESPACE JTINLAND.SCHSSTCK
, TABLESPACE JTINLAND.SCHSRORD
, TABLESPACE JTINLAND.SCPEPRCE
, TABLESPACE JTINLAND.SQOMFGHD
, TABLESPACE JTINLAND.SQOMFCHI
, TABLESPACE JTINLAND.SQOMFCMT
, TABLESPACE JTINLAND.SQOMFOVR
, TABLESPACE JTINLAND.SQOMFOVU
, TABLESPACE JTINLAND.SQOMFMPL
, TABLESPACE JTINLAND.SQOMFOVP
, TABLESPACE JTINLAND.SQOMFCHE
, TABLESPACE JTINLAND.SQOMFUNT
, TABLESPACE JTINLAND.SQOMFTRQ
, TABLESPACE JTINLAND.SCHEITMR
, TABLESPACE JTINLAND.SCHORDFW

-continued

, TABLESPACE JTINLAND.SCHORHLD
, TABLESPACE JTINLAND.SCHREFRL
, TABLESPACE JTINLAND.SCHRETYP
, TABLESPACE JTINLAND.SCPEPICS
, TABLESPACE JTINLAND.SCHERCYL
, TABLESPACE JTINLAND.SCHCACKW

Therefore, recovery of a parent tablespace or reload of a parent table involves substantial efforts by the user of utility to identify all of the dependent tablespaces to be checked.

Furthermore, in a mainframe environment running MVS or a similar operating system, when a program executes, that program is considered to be a job for MVS. For example, when a customer executes a utility, the utility is a job step that must be executed. When the recover operation is executed, it is a subtask of the utility job step. Similarly, when a reload operation is executed, it is also a subtask of the utility job step. When a check operation is executed, it is also a subtask of the utility job step. A MVS job may have many tasks. Execution of a subtask requires virtual storage (e.g., memory).

MVS will provide the virtual storage whenever a subtask needs it. For example, when a recover utility or a reload utility identifies the dependent tables associated with the parent table being recovered or reloaded, the utility reads the DB2 catalog and reads the dependent table names into virtual storage allocated for the subtask so that, for example, the dependent tables can be placed in a check pending status following a recover or reload action. When the subtask terminates, MVS will clean up and any allocated data area (e.g., virtual storage) will be freed by MVS so that another subtask can use the data area. Accordingly, the data contained in the freed storage are (e.g., the names of the dependent tablespaces) is deleted when the data area is freed and thus the deleted information is not available for subsequent use, for example by the check utility that needs to check each dependent table.

SUMMARY OF THE INVENTION

According to an embodiment of the present invention, a recover or reload utility determines if a check utility is to be executed. If a check utility is to be executed, the recover or reload utility can record the dependent tablespace names to persistent virtual storage allocated to a job step instead of to temporary virtual storage allocated to a subtask. After the recover or reload utility performs its function, if a check utility is next, then the database operating system will not freemain the persistent virtual storage (e.g, data area) into which the recover or reload utility has recorded the names of the dependent tablespaces when the subtask ends.

Thus, according to an embodiment of the present invention, when the recover or reload utility identifies the names of the dependent tablespaces, it will record the names into a persistent data area. Upon termination of the recover or reload utility, the persistent data area is available for the check utility to use. Accordingly, the check utility does not have determine the dependent tablespaces to be checked—e.g., no additional reading of the DB2 catalog by the check utility is required.

DETAILED DESCRIPTION OF THE INVENTION

Figure 1:
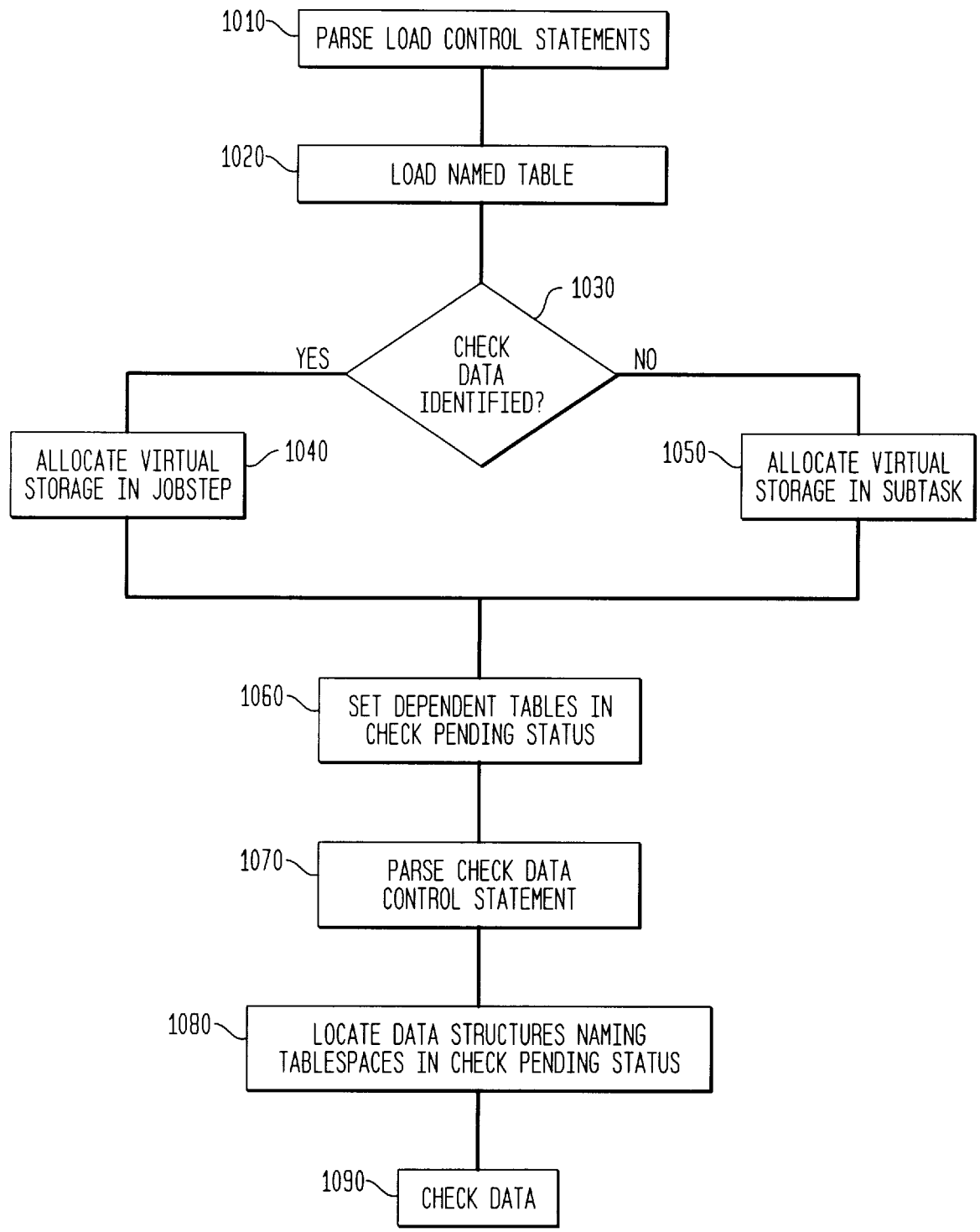
FIG. 1 illustrates an exemplary flowchart for a method of checking tablespaces according to an embodiment of the present invention for a load utility.

FIG. 1 illustrates an exemplary flowchart for a method of checking tablespaces according to an embodiment of the present invention for a load utility. In step 1010, a load control statement is parsed. The control statement may have the form, for example, of

```
    LOAD RESUME NO REPLACE INTO TABLE CTINLAND.TBHAMEP1
    LOAD RESUME NO REPLACE INTO TABLE CTINLAND.TBHAMEP2
    LOAD RESUME NO REPLACE INTO TABLE CTINLAND.TBHAMEP3
    CHECK DATA (JTINLAND.SCHAMEP1, JTINLAND.S CHAMEP2,
JTINLAND.SCHAMEP3)
```

As indicated by the above control statement, the load control statement includes a check utility control statement (e.g., "CHECK DATA JTINLAND.SCHAMEP1"). In contrast, conventional load utility control statements do not include a control statement for a check utility. The parsing of the control statement includes, for example, identifying the terms contained in the control statement by the load utility so that the load utility can perform the load operation on the named table(s), for example in a manner known in the art. The syntax of the load control statement illustrated above is exemplary and any desired format or syntax can be utilized provided, however, that the load utility can process the selected format or syntax. In step 1020, the table named in the control statement is loaded, for example in a manner known in the art.

In step 1030, it is determined if a check data utility is identified in the control statement. For example, according to an embodiment of the present invention, a check data control statement is included with the load control statement. As a result, when the load utility parses the load utility control statement, the load utility can identify that a check utility will be run after the load utility. If no check data utility is identified in the control statement, then virtual storage (e.g., memory) is allocated for the subtask (e.g., the execution of the load utility). For example, as part of the operation of a conventional load utility, the MVS operating system would allocate temporary virtual storage (e.g., getmain the data structures in the task subpool). As is known in the art, virtual storage allocated for the task subpool is cleared (e.g., freed) when the subtask ends. If a check utility is identified in step 1030, then in step 1040, virtual storage is allocated in the jobstep. For example, the MVS operating system allocates persistent virtual storage (e.g., getmain the data structures in the jobstep subpool).

Following step 1040 or step 1050, the dependent tables are set to a check pending status, for example in a manner known in the art. In step 1070, the check data control statement, for example contained in the load control statement, is parsed to start the check data process. In step 1080, the check utility locates the data structures (e.g., virtual storage) naming the tablespaces in check pending status. In step 1090, the check data process is performed, for example in a manner known in the art. Pseudocode for an exemplary embodiment of the process illustrated in FIG. 1 is provided below.

```
Parse Load control statements
Load named table
If check utility is next
    Getmain the data structures in jobstep subpool else
    Getmain the data structures in task subpool endif
```

-continued

```
Set dependent tablespaces in check pending
If check utility is next
    Parse Check Data control statements
    Check utility locates the data structures naming the
    tablespaces in check pending
    Perform Check Data process endif
```

Thus, according to an embodiment of the present invention, an interface is provided between the load utility and the check utility to take advantage of the work already performed by the load utility to name the dependent tables needing to be checked by the check utility. As a result, the check utility does not need to read, for example, the DB2 catalog as the load utility has already performed this task and saved the information to persistent virtual storage. Accordingly, a user of the load and check utilities does not need to identify all of the dependent tablespaces to the check utility.

Figure 2:
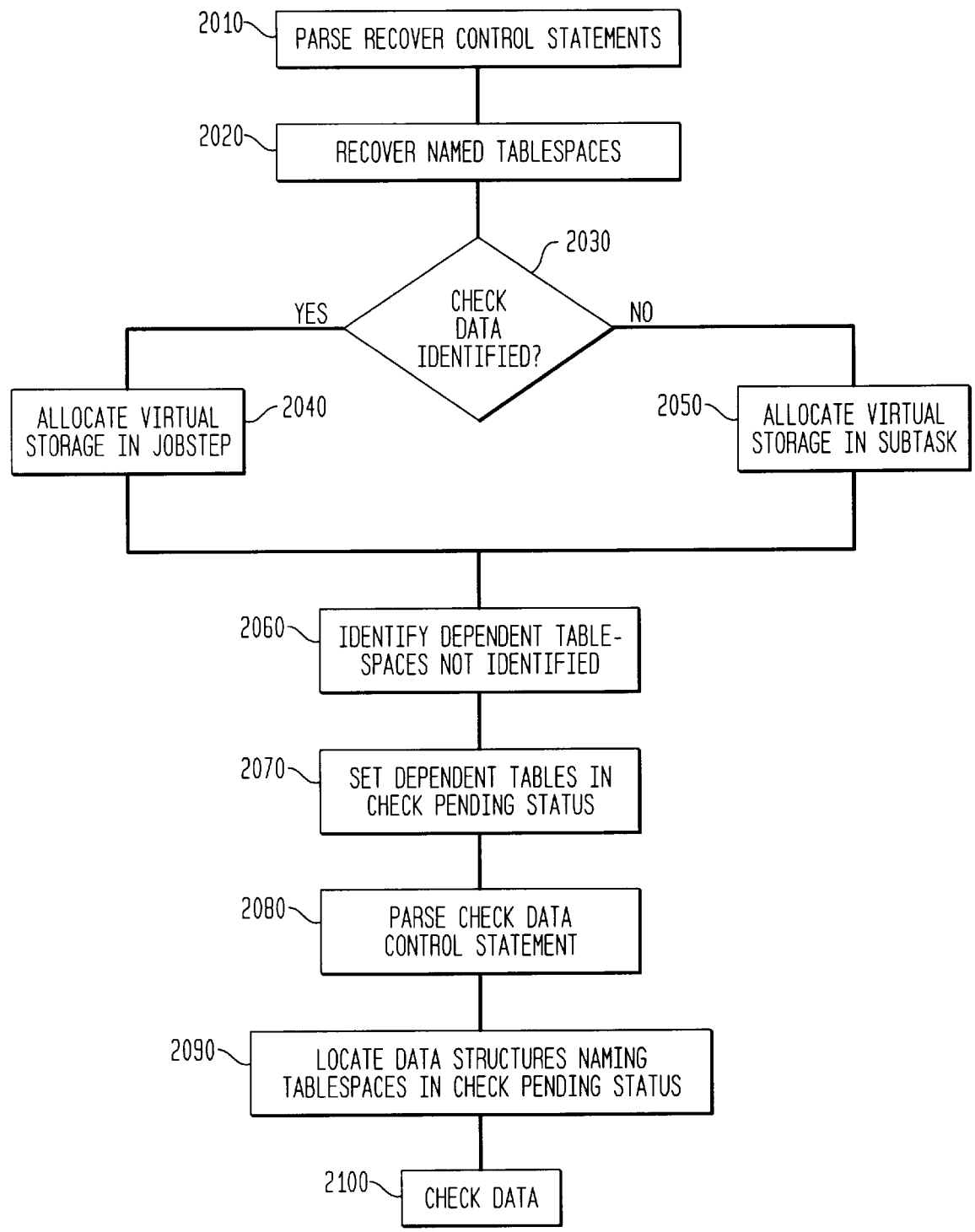
FIG. 2 illustrates an exemplary flowchart for a method of checking tablespaces according to an embodiment of the present invention for a recover utility.

FIG. 2 illustrates an exemplary flowchart for a method of checking tablespaces according to an embodiment of the present invention for a recover utility. In step 2010, a recover control statement is parsed. The control statement may have the form, for example, of

```
RECOVER TABLESPACE JTINLAND.SCHAMEP1
        TABLESPACE JTINLAND.SCHAMEP2
        TABLESPACE JTINLAND.SCHAMEP3
        CHECK DATA JTINLAND.SCHAMEP1,
    JTINLAND.SCHAMEP2, JTINLAND.SCHAMEP3
```

As indicated by the above control statement, the recover control statement includes a check utility control statement (e.g., "CHECK DATA JTINLAND.SCHAMEP1"). In contrast, conventional recover utility control statements do not include a control statement for a check utility. The parsing of the control statement includes, for example, identifying the terms contained in the control statement by the recover utility so that the recover utility can perform the recover operation on the named tablespace(s), for example in a manner known in the art. The syntax of the recover control statement illustrated above is exemplary and any desired format or syntax can be utilized provided, however, that the recover utility can process the selected format or syntax. In step 2020, the tablespace named in the control statement is recovered, for example in a manner known in the art.

In step 2030, it is determined if a check data utility is identified in the control statement. For example, according to an embodiment of the present invention, a check data control statement is included with the recover control statement. As a result, when the recover utility parses the recover utility control statement, the recover utility can identify that a check utility will be run after the recover utility. If no check data utility is identified in the control statement, then virtual storage (e.g., memory) is allocated for the subtask (e.g., the execution of the recover utility). For example, as part of the operation of a conventional recover utility, the MVS operating system would allocate temporary virtual storage (e.g., getmain the data structures in the task subpool). As is known in the art, virtual storage allocated for the task subpool is cleared (e.g., freed) when the subtask ends. If a check utility is identified in step 2030, then in step 2040, virtual storage is allocated in the jobstep. For example, the MVS operating system allocates persistent virtual storage (e.g., getmain the data structures in the jobstep subpool).

Following step 2040 or step 2050, the dependent tablespaces that were not recovered are identified in step 2060. In step 2070, the dependent tablespaces are set to a check pending status, for example in a manner known in the art. In step 2080, the check data control statement, for example contained in the recover control statement, is parsed to start the check data process. In step 2090, the check utility locates the data structures (e.g., virtual storage) naming the tablespaces in check pending status. In step 2100, the check data process is performed, for example in a manner known in the art. Pseudocode for an exemplary embodiment of the process illustrated in FIG. 2 is provided below.

```
Parse Recover control statements
    Recover named tablespaces
    If Check Data is next
        Getmain the data structures in jobstep subpool else
        Getmain the data structures in task subpool endif
    Identify dependent tablespaces that were not recovered
    Set dependent tablespaces in check pending
    If Check Data is next
        Parse Check Data control statements
        Check Data locates the data structures naming the tablespaces
```

-continued

```
    in check pending
        Perform Check Data process endif
```

Thus, according to an embodiment of the present invention, an interface is provided between the recover utility and the check utility to take advantage of the work already performed by the recover utility to name the dependent tables needing to be checked by the check utility. As a result, the check utility does not need to read, for example, the DB2 catalog as the recover utility has already performed this task and saved the information to persistent virtual storage. Accordingly, a user of the check utility does not need to identify all of the dependent tablespaces to the check utility.

What is claimed is:

1. A method for checking tablespaces in a database management system, the database management system including a load utility and a check utility, the method comprising the steps of:

parsing a load utility control statement;

determining, as a function of the parsed load utility control statement, if a check utility is identified;

if the check utility is identified, allocating a persistent storage area for use by the load utility;

recording, by the load utility, a name of a tablespace in the persistent storage area; and locating the persistent storage area for use by the check utility.

2. A method for checking tablespaces in a database management system, the database management system including a recover utility and a check utility, the method comprising the steps of:

parsing a recover utility control statement;

determining, as a function of the parsed recover utility control statement, if a check utility is identified;

if the check utility is identified, allocating a persistent storage area for use by the recover utility;

recording, by the recover utility, a name of a tablespace in the persistent storage area; and locating the persistent storage area for use by the check utility.

\* \* \* \* \*